Figure 1:
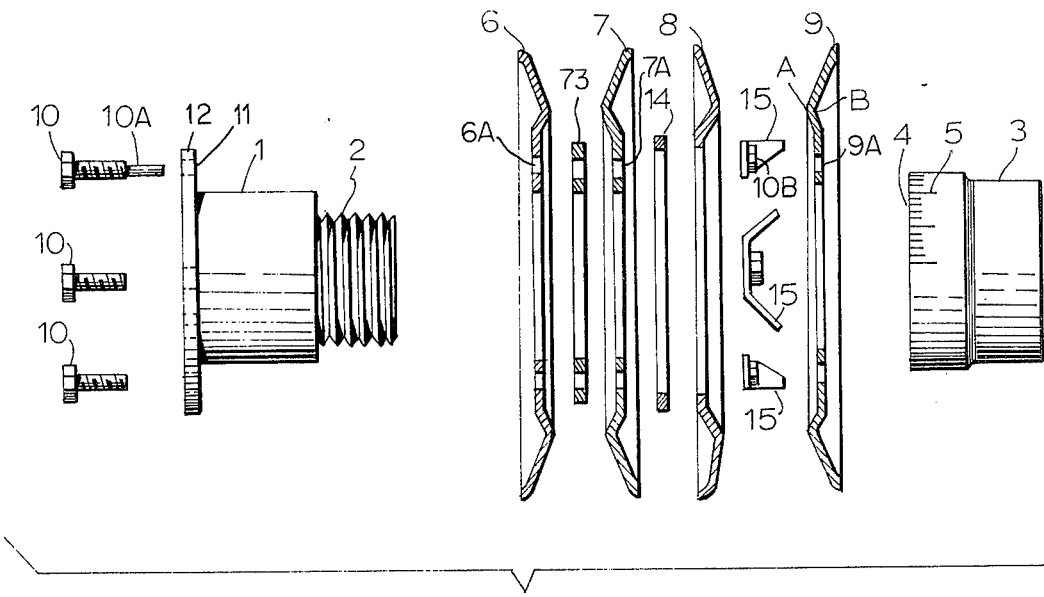

United States Patent [19]

Hurley

[11] 3,929,302
[45] Dec. 30, 1975

[54] PULLEY WHEELS

[75] Inventor: Joseph John Hurley, Paisley, Scotland

[73] Assignee: J & P Coats Limited, Glastow, Scotland

[22] Filed: July 31, 1973

[21] Appl. No.: 384,307

[30] Foreign Application Priority Data

Aug. 5, 1972 United Kingdom............ 36651/72

[52] U.S. Cl. ............................ 242/155 R; 74/230.16
[51] Int. Cl. .............................................. B65h 59/16
[58] Field of Search ........ 242/155 R, 155 M, 47.01; 226/190–193; 74/230.4, 230.5, 230.6, 230.8, 230.11–230.16, 230.17 R, 230.7 A, 230.7 B, 230.7 C

[56] References Cited
UNITED STATES PATENTS

| | | | |
|---|---|---|---|
| 794,516 | 7/1905 | Kron | 74/230.17 C UX |
| 939,427 | 11/1909 | Main | 74/230.17 B |
| 2,074,199 | 3/1937 | Arnold | 74/230.8 |
| 3,154,260 | 10/1964 | Stanislao et al. | 242/47.01 |

FOREIGN PATENTS OR APPLICATIONS

| | | | |
|---|---|---|---|
| 1,337,695 | 8/1963 | France | 242/155 R |
| 920,981 | 12/1954 | Germany | 242/155 R |
| 758,055 | 9/1956 | United Kingdom | 226/193 |

*Primary Examiner*—Stanley N. Gilreath

[57] ABSTRACT

An adjustable differential pulley has two co-axial pulley elements each having a circumferential groove. At least one pulley element is formed by two dished pulley cheeks having curved interlacing spokes. The cheeks are movable axially relatively to one another and means is provided for holding the cheeks in a chosen axial spacing.

2 Claims, 3 Drawing Figures

U.S. Patent  Dec. 30, 1975  3,929,302

PULLEY WHEELS

This invention relates to pulleys and particularly to differential pulleys of the double-groove type, i.e. the type of pulley which has two co-axial pulley elements of different diameters, such a pulley being especially for use in a device for stretching or drafting yarns and threads. In such a mechanism the stretching or drafting operation is performed by leading a yarn or a thread successively in separate passes over first the smaller diameter pulley element and then over the larger diameter pulley element. The two pulley elements move with the same angular velocity, but the larger diameter pulley element has the greater circumference and thus has a greater peripheral speed so that a stretching or drawing action is performed on the yarn or thread. As it is often necessary to change the proportion of stretch or draft to which a yarn or a thread is to be subjected it would obviously be of considerable advantage to be able to change the effective diameter of at least one of the pulley elements and it is an object of the present invention to provide a double-grooved pulley of simple construction in which the relative diameters of the two pulley elements can be changed readily.

A differential pulley according to the invention incorporates two co-axial pulley elements connected to one another, each pulley element presenting a circumferential groove, at least one of the pulley elements comprising two dished pulley cheeks each formed with spokes reflexly curved so that opposite faces of the cheek present an annular convexity and an annular concavity respectively, the cheeks of each pulley element being so placed together that the faces formed with the annular convexities are adjacent one another with the spokes interlacing and the cheeks being also movable axially relatively to one another, and setting means operative in conjunction with the pulley cheeks to set and hold the cheeks in a chosen axial position relative to one another.

Both pulley elements may incorporate dished pulley cheeks formed with reflexly curved spokes, each pulley element being formed of two cheeks placed together with the faces formed with the annular convexities adjacent one another and the spokes interlacing.

The pulley element incorporating the relatively movable pulley cheeks may include a thrusting means located between the cheeks and urging the cheeks to move relatively apart and an axially movable abutment member arranged to act in opposition to the thrusting means to limit the relative axial movement of the pulley cheeks and hold them in a particular spaced relationship.

The thrusting means may consist of leaf springs interposed between the pulley cheeks.

The pulley cheeks may be mounted on a hub having a screw-threaded portion, one pulley cheek being held against axial movement on the hub, the abutment member being constituted by an internally screw-threaded stop ring engaged with the screw-threaded portion of the hub and presenting an end face engageable with the other pulley cheek which is freely mounted on the hub.

The stop ring may be calibrated around its periphery with markings a selected one of which can be brought opposite a datum mark provided at a convenient fixed position on the pulley whereby to facilitate resetting of the pulley to a previously used ratio.

It is normally sufficient that the effective diameter of one pulley element should be variable, the diameter of the other pulley element being invariable. In such a construction the non-adjustable pulley element may be of any conventional construction and the adjacent pulley cheek of the pulley element having the relatively movable cheeks may be fixed to the non-adjustable pulley element, a ring being interposed if necessary to provide the requisite spacing.

Where the pulley is to provide a high tractive force on a yarn or a thread wrapping the pulley each of the two pulley elements may comprise two dished pulley cheeks each formed with spokes which are reflexly curved so that opposite faces of the cheek present an annular convexity and an annular concavity respectively, the cheeks of each pulley element which have their faces formed with the annular concavity being adjacent one another with the spokes interlacing.

The pulley cheeks fixed to one another may be held to one another and to the hub by bolts disposed parallel to the axis of the hub and penetrating a flange presented by the hub. One of the bolts at least may be formed with an extension arranged to penetrate the axially movable pulley cheek so that the said movable pulley cheek cannot rotate relatively to the other cheeks.

The hub may be arranged for rotation around a fixed stub axle attached to a fixed support.

Figure 2:
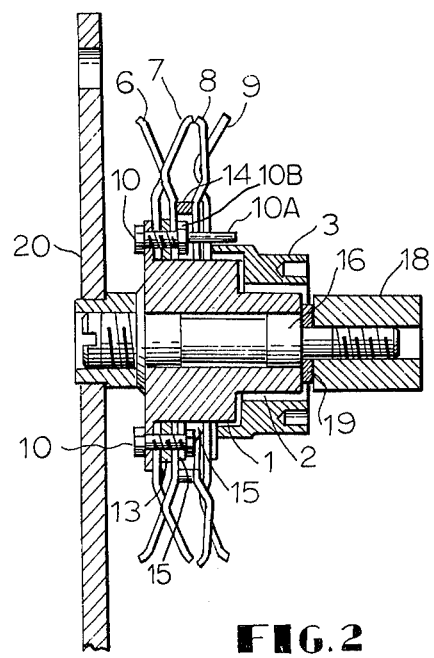
Figure 3:
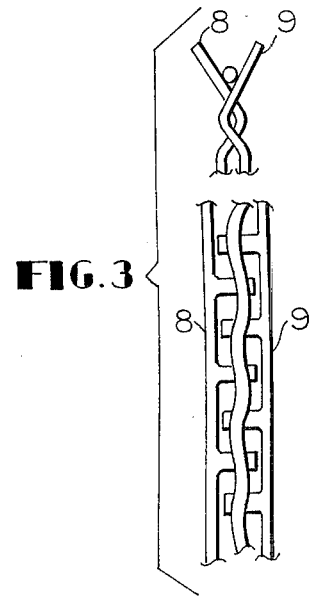

A practical embodiment of the invention is illustrated in the accompanying drawings in which FIG. 1 is an exploded view of a pulley showing the several parts withdrawn axially from one another, FIG. 2 is a drawing showing an assembled pulley in section, and FIG. 3 shows the path of a yarn or thread passing around a pulley element having a groove formed by the interlacing spokes of two pulley cheeks.

In the drawings, 1 denotes a hub formed with a screw-threaded portion 2 for reception of an abutment member constituted by a stop ring 3 presenting an end face 4. The periphery of the stop ring 3 is calibrated with markings 5. 6, 7, 8 and 9 denote four dished pulley cheeks, each pulley cheek being formed with spokes so curved that opposite faces of the cheek present an annular convexity A and an annular concavity B respectively, the four pulley cheeks being mounted on the hub 1 as indicated in FIG. 2 and being held non-rotatably on the hub 1 by bolts 10 penetrating holes 11 in a flange 12 presented by the hub 1 and holes 6A and 7A in the pulley cheeks 6 and 7 respectively. The pulley cheeks 6 and 7 constitute one pair forming together one pulley element the spokes of the cheeks 6 and 7 interlacing and the cheeks being held in a chosen spaced relation by shims 13. The pulley elements 8 and 9 constitute another pair forming together the other pulley element. The pulley cheeks 6 and 7, and 8 and 9 have their convex faces towards one another and their spokes interlacing. The cheeks 8 and 9 are not held rigidly to one another because in the embodiment illustrated the pulley element constituted by the cheeks 8 and 9 is the pulley element of which the effective diameter is adjustable. The cheek 7 of the one pair is held to the cheek 8 of the other pair by a spacing ring 14 to which the two cheeks 7 and 8 are spot welded while the cheek 9 can move axially relatively to the cheek 8 along the hub 1 but is prevented from rotating relatively to the other cheeks 6, 7 and 8 by an extension 10A of one of the bolts 10 which penetrates a hole 9A in the pulley cheek 9. Thrusting means constituted by leaf springs 15 held under the nuts 10B on selected bolts 10 press against the pulley cheek 9 and urge it to move axially in the direction away from the pulley cheek 8. The central portion of each leaf spring 15 is held by the associated nut 10B and the outwardly bent ends come against the pulley cheek 9 and urge the cheek 9 away from the cheek 8. The axial movement of the pulley cheek 9 under the urge of the springs 15 is restrained by the stop ring 3 fitted to the screw-threaded portion 2 of the hub 1. The end face 4 on the stop ring 3 acts as an abutment against which the pulley cheek 9 is pressed by the springs 15. The pulley assembly is mounted on a stub axle 16 on which the hub 1 is freely rotatable. The hub is located on the stub axle 16 by a flange 17 provided at one end of the stub axle 16 and by a collar 18 screwed on to a screw thread on the other end of the stub axle 16, a washer 19 being located between the collar 18 and the hub 1. 20 denotes a support member which does not form part of the present invention but which here supports the stub axle 16 and thus the pulley assembly.

In practice, the effective diameter of the adjustable pulley element 8, 9 is varied by rotating the stop ring 3 to screw it farther on to the hub 1 or retract it from the hub. The markings 5 make it easy to reset the pulley element to the chosen setting. Screwing the stop ring 3 farther on to the hub 1 moves the movable cheek 9 of the pair of pulley cheeks presenting the adjustable diameter pulley element towards the fixed cheek 8 of the same pulley element. Because of the curved shape of the spokes of the two cheeks 8 and 9 the diameter at the intersection of the interlacing spokes increases and presents a groove of increased effective diameter. Rotation of the stop ring 3 in the opposite direction permits the leaf spring 15 to force the two cheeks 8 and 9 of the adjustable pulley element further apart thus reducing the diameter at the intersection of the interlacing spokes of the two cheeks and consequently the effective diameter of the pulley element.

In the art there is known a process in which yarn or thread is stretched by as much as 30%. The tension necessary to effect a stretch of this magnitude cannot normally be imparted to a yarn or thread purely by the frictional grip of the yarn or thread on a pulley without passing the yarn or thread several times around the pulley. This is undesirable for several practical reasons. The pulley of the present invention and particularly the embodiment in which both pulley elements incorporate interlacing spokes forming the grooves, causes the yarn or thread to adopt a sinusoidal shape as it passes from one spoke to the next in the manner shown in FIG. 3. As a consequence the traction of the pulley on the yarn or thread is so much enhanced that the required tension to produce a stretch of as much as 30% can be generated in a yarn or thread while the yarn or thread wraps less than the full circumference of the pulley.

What is claimed is:

1. A differential pulley incorporating a hub having a flange at one end and a screw-threaded portion at the other end, two co-axial pulley elements mounted on the hub and connected to one another, each pulley element presenting a circumferential groove, the pulley element adjacent the screw-threaded end of the hub comprising two dished pulley cheeks each formed with spokes so curved that opposite faces of the cheek present an annular convexity and an annular concavity respectively, the cheeks of said pulley element being so placed together that the faces formed with the annular convexities are adjacent one another with the spokes interlacing, the pulley cheek adjacent the screw threaded end of the hub being movable axially on the hub, and the other pulley cheek being fixed on the hub, leaf springs located to act between the cheeks and urge the cheeks to move relatively apart, an axially movable abutment member arranged to act in opposition to the leaf springs formed as an internally screw-threaded stop ring engaged with the screw-threaded portion of the hub and presenting an end face engageable with the axially movable pulley cheek and bolts disposed parallel to the axis of the hub penetrating the flange and also the fixed pulley cheek, one of the bolts at least being formed with an extension arranged to penetrate the axially movable pulley cheek so that the said movable pulley cheek cannot rotate relatively to the other cheeks.

2. A pulley as claimed in claim 1 in which the other pulley element comprises two dished pulley cheeks each formed with spokes which are so curved that opposite faces of the cheek present an annular convexity and an annular concavity respectively, the cheeks of each pulley element which have their faces formed with the annular concavity being adjacent one another with the spokes interlacing.

* * * * *